United States Patent

[11] 3,578,300

[72] Inventor Allen C. Goodrich
 East Aurora, N.Y.
[21] Appl. No. 785,519
[22] Filed Dec. 20, 1968
[45] Patented May 11, 1971
[73] Assignee The Carborundum Company
 Niagara Falls, N.Y.

[54] BAKING FURNACE
 7 Claims, 3 Drawing Figs.

[52] U.S. Cl. .................................................. 263/41
[51] Int. Cl. .................................................. F27b 5/00
[50] Field of Search .......................................... 263/41, 42; 25/153

[56] References Cited
UNITED STATES PATENTS

| | | | |
|---|---|---|---|
| 3,048,382 | 8/1962 | Mansfield | 263/41 |
| 3,142,482 | 7/1964 | Kenan | 263/41 |
| 3,448,971 | 6/1969 | Renkey | 263/41 |

Primary Examiner—John J. Camby
Attorney—K. W. Brownell

ABSTRACT: A baking furnace for carbonaceous bodies, such as electrodes for the steel industry, having metal flues extending therethrough for conveying the baking heat to the baking media that surrounds the bodies. Inserts of heat conductive material are strategically placed in the media so as to facilitate the distribution of heat from the flues to the area of the bodies and to obtain a uniformity of baking temperature therearound.

Patented May 11, 1971

INVENTOR
ALLEN C. GOODRICH,

BY K. W. Brownell
ATTORNEY

Patented May 11, 1971  3,578,300

INVENTOR
ALLEN C. GOODRICH,

BY K.W. Brownell
ATTORNEY

BAKING FURNACE

BACKGROUND OF THE INVENTION

This invention relates to an improvement in baking furnaces particularly constructed for the processing of carbonaceous bodies such as electrodes for the steel industry. The practice of constructing baking furnaces to process carbonaceous bodies, essentially has been to construct several nonmetallic refractory brick compartments or chambers into which the "green" carbonaceous bodies are placed. The "green" bodies are usually packed in a mixture of sand and coke to prevent oxidation, to support the bodies, and to prevent slump when the furnace temperature rises above the melting point of the binders. Heated gases are typically circulated around these chambers along the sidewalls of the furnace. In some cases, gases pass under the chamber and also through the partitioning flue walls which divide the furnace into individual chambers. The green carbonaceous bodies are baked by the heat from the circulating gases. These furnaces were originally constructed in a somewhat permanent manner which involved considerable nonmetallic brick and flue installation requiring great time and expense.

Furnaces of such a permanent nature were seldom efficient for baking green stock of widely differing sizes. Nonuniformity in the speed and extent of baking was a frequent result. High scrap losses and nonuniform physical properties resulted.

The size of bodies being baked in such a furnace is also limited by the geometry of the chambers. Special furnaces were required to bake odd-size pieces. Nonmetallic refractory brick flues are expensive to construct and maintain.

Metallic flues were installed in later furnaces to overcome some of the difficulties enumerated above. These metal flues were less expensive, more easily installed, more flexible, and more thermally efficient. Baking furnaces with metal flue ducts do not, however, result in more uniform heating of the bodies being baked. On the contrary, the improved thermal conductivity resulted in hot spots close to the flues. For some packing geometrics, the carbon bodies may be heated more rapidly at positions closer to the flue ducts. The installation of more highly conductive packing materials tends to aggravate this localized heating. The metallic flues overcome many costly construction, maintenance, and changing packing geometry problems, but at the same time, they introduced local hot spots.

SUMMARY OF THE INVENTION

One object of this invention is to improve the construction of baking furnaces for the purposes described and to obtain a more uniform distribution of heat to the bodies placed therein for baking.

Another object of this invention is to obtain a more uniform heating of the green carbonaceous bodies than has been possible heretofore with prior baking furnaces for the purpose.

These objects may be accomplished by providing directional thermal conductivity through inserts installed in the furnace in a manner which will remove the heat from the conductive or metallic flues and distribute the heat to special points in the baking media so that the baking carbonaceous bodies will be at a more nearly uniform temperature level.

The invention relates to an improved furnace which is particularly adapted to bake carbonaceous bodies of widely differing shapes and sizes, and to accomplish this under conditions of increased thermal efficiency, temperature uniformity, increased furnace capacity, and reduced furnace construction and operational costs. The invention relates further to the use of the described furnace while achieving improved quality in the baked bodies produced. Particularly, the invention relates to directional thermal conductivity implemented by a furnace which includes specific inserts which may be more conductive than the packing media as appendages on or adjacent to the flue ducts to direct the flow of heat to special points in the charge in a manner which reduces the temperature differences in the baking stock. The invention also relates to directional thermal conductivity implemented by a furnace modification which includes nonconductive inserts that are less conductive than the packing media, positioned in the packing media between the flue ducts and the carbonaceous bodies being baked in a manner which reduces the temperature differences in the baking stock.

BRIEF DESCRIPTION OF DRAWINGS

One embodiment of the invention is illustrated in the accompanying drawings, in which.

DETAILED DESCRIPTION OF DISCLOSURE

Figure 1:
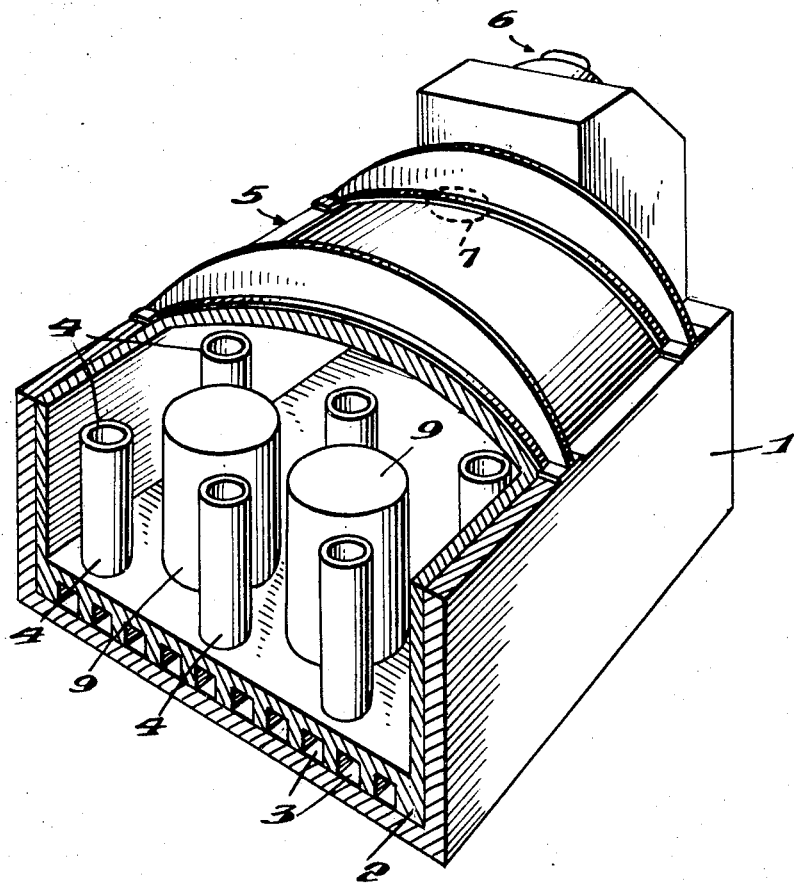
FIG. 1 is a perspective view, partly in section, of a baking furnace to which the invention may be applied.
Figure 2:
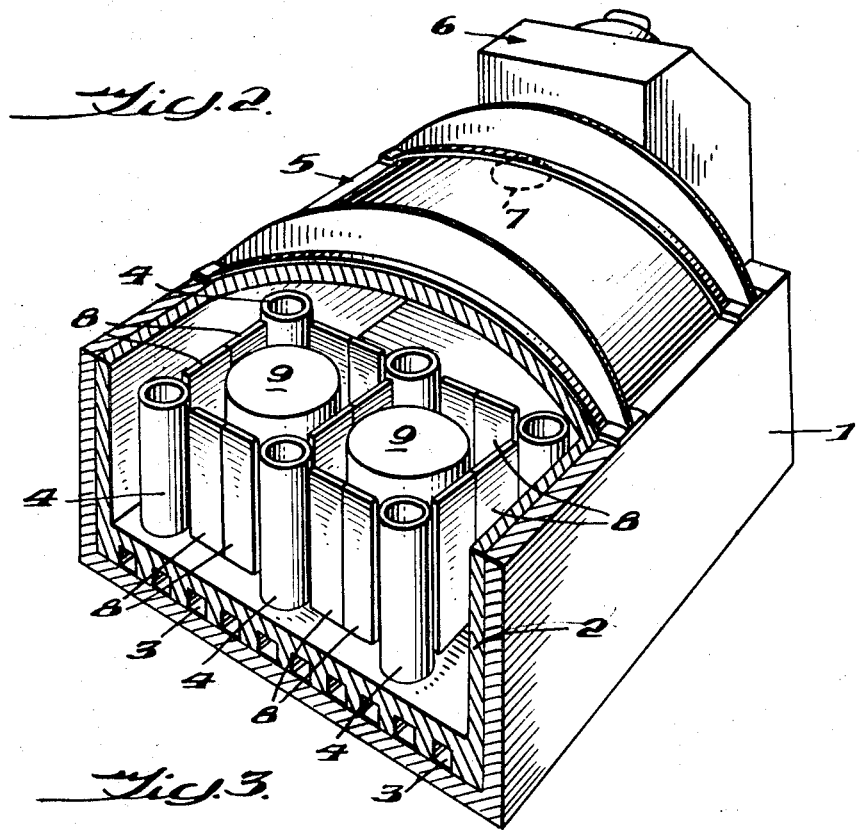
FIG. 2 is a similar view, illustrating the application of the conductive inserts to the furnace.

Referring to the embodiment of the invention illustrated in FIGS. 1 and 2, the furnace may be made typically by pouring concrete for the outer frame or shell 1 of the dimensions desired. This shell 1 may be provided with a lining 2 along the sides and bottom of the shell as by a system of nonmetallic refractory bricks. The bottom of this refractory lining forms a system of channels or tunnels 3 which are in open communication with conductive or metallic flues 4 extending vertically within the chamber formed in the outer shell 1.

This chamber is adapted to receive the "green" bodies which may be made of carbonaceous material when these are adapted to form electrodes for the steel industry, as an example. Ordinarily, these bodies are packed in a mixture of sand and coke which fills the chamber around the bodies and between and around the flues 4, but which is omitted from the illustrations in FIGS. 1 and 2 for clearness. The flues 4 extend to the top of the charge of sand and coke and of the carbonaceous bodies and are open inside the chamber of the furnace. The top of the furnace is shown as bridged over by a refractory-lined hogback cover 5.

The furnace is heated by a firebox or combustion zone 6 from which, by means of a fan or other suitable draft means, the heated gases are forced through an opening 7 under the hogback cover 5, down the flues 4, through the tunnels 3, thence to a suitable stack (not shown), or the gas may be recycled to the combustion zone. The direction of hot gas flow may be reversed if desired. Flues or other gas channels are placed frequently in the outer furnace shell.

As illustrated in FIG. 2, conductive inserts or slabs, indicated at 8, are mounted in upright relation between the adjacent flues 4 and in a pattern substantially to surround the "green" bodies 9 of carbonaceous material. These inserts or slabs of heat-conducting material distribute the heat to points in the packing medium spaced from the flues 4 and thereby result in more uniform temperatures in the medium and particularly at the surfaces of the carbonaceous bodies where the baking reaction occurs.

A number of conductive insert materials and geometrics can be utilized to accomplish the directional heat transfer. Slabs of graphite which are the normal scrap or off-specification product of the modern electrode plant, have economic advantages for this application. These conductive graphite slabs may be any of a wide variety of sizes and shapes depending on the particular packing geometry. The conductive inserts may also be constructed of metals such as steel, stainless steel, and other relatively conductive materials. These inserts may be attached to the flue pipe or placed in special ways to accomplish the directional conductivity within the packing medium.

After the conductive or metal flues are positioned in a manner which provides the most efficient use of the space with respect to the size and shape of the green carbon bodies to be baked, the packing materials and the bodies to be baked are placed in the furnace in accordance with conventional techniques employed in the art. The number of flues employed and their positioning, and the positioning of the carbon bodies will, of course, be selected with regard to the baking cycle to be followed, to promote evenness of baking of the carbon bodies. The conductive inserts will be installed, based on an empirical and mathematical study of the overall thermal conductivity and temperature profile of the systems during the baking period and in such a manner that the temperatures of the surfaces of the green carbon bodies will be nearly equal or such that their rate of temperature rise will be commensurate with the desired baking cycle and the production of desirable physical properties in the baked product.

The inserts 8 may be fabricated of a suitable thermally conductive metal that is more heat-conductive than the packing media, such as sand and coke. However, it is also possible, according to this invention, to use conductive nonmetals, such as graphite.

Under some conditions, it may be found desirable to use other relative variations of heat conductivity, according to the desired temperature gradients within the furnace. For example, the inserts may be less conductive than the packing media, or fabricated from thermally resistant materials such as certain ceramic materials including rockwool and mica. Inserts may be used which are chemically changed in the presence of heat and in such manner that heat is absorbed by the insert and thereby alters the thermal gradient profile within the packing media, thereby adjusting the rate of flow of heat to the carbonaceous bodies that constitute the furnace charge.

Inserts may be used which contain passageways for cooling media, including liquids and gases, which may be but are not necessarily volatile, such as water, and may include inert gases, hydrocarbons, air and products of combustion.

The objective of this invention is the uniform and efficient transfer of heat from the hot gases originating in the combustion zone to the baking carbonaceous bodies. It is apparent that the inserts may be extended into the hot gas zones, such as into the hogback, and from here be extended into the packing area, thus improving the efficiency of the heat transfer.

The tops of the metal flues should typically be about flush with the top of the packing media cover placed in the furnace. This cover is normally a layer of sand on top of the packing media. The packing media may be a mixture in varying proportions of sand and coke. This packing media surrounds the stock being baked. Its function is to serve as a heat transfer media to minimize or prevent the oxidation of the stock being baked and to support the green bodies while they are being baked. It and the sand cover should, of course, be kept out of the flue system. The packing media is thermally treated to reduce shrinkage during the baking cycle. It is carefully settled and compacted about the green bodies in a manner that will prevent slumping of the green body. According to this invention, more uniform temperatures and more efficient bake furnace utilization can be achieved by employing conductive inserts of metal, graphite, or other thermally conductive material strategically placed in the charge so as to reduce the temperature difference at points in the packing media.

During the baking of large electrodes of 20 or more inches in diameter, it is necessary to reduce the temperature rise to approximately 1° per hour in conventional furnaces to prevent excessive scrap losses. The rate of temperature rise is a function of the size of the stock being baked and the packing pattern. The baking process involves chemical and physical changes which involve the liberation of gases and changes in the dimensions of the body. Unless the gases are evolved at a slow uniform rate, so that the dimensional changes are quite uniform throughout the charge, damage to the physical properties and cracking of the stock will usually result. An increase in scrap level and poor quality product can make the process less economical.

The thermal conductivity of the carbonaceous charge (3.0 B.t.u./hr./sq.ft./°F./ft.) can be far greater than that of the packing medium which is normally a mixture of sand (0.19 B.t.u./hr./sq.ft./°F./ft.) and coke (0.55 B.t.u./hr./sq.ft./°F./ft.) particles. Poor thermal conductivity of the packing medium can result in undesirable temperature differences in the charge stock if the flue temperatures are raised too rapidly. It does not normally help to reduce the resistance of the packing medium because this increases the possibility of hot spots in the baking body close to the flue ducts.

The installation of these directional heat conductors reduces the temperature differences in the packing medium. The flue temperatures can be raised more rapidly without damaging the green bodies. The furnace efficiency can, therefore, be increased by decreasing furnace residence time and by reducing scrap losses.

Figure 3:
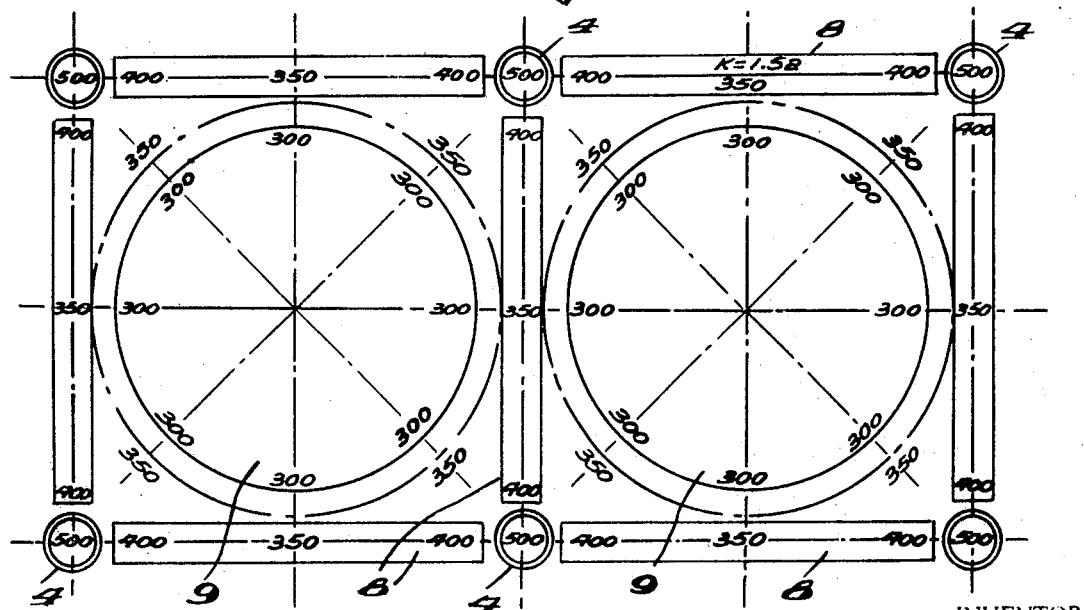
FIG. 3 is a diagrammatic plan view, showing the directional heat conductors in relation to the flues and bodies.

FIG. 3 shows diagrammatically the temperature effects obtained with directional heat conductors in the furnace according to this invention. Iso-temperature lines reveal the change in surface temperature uniformity resulting from the use of directional heat conductors. The difference between iso-temperature lines decreases as temperature gradients increase.

Thus, according to this invention, a more uniform heating of the green carbonaceous bodies can be obtained by employing a system of conductive inserts in the furnace packing media. These inserts provide directional thermal conductivity. The inserts are installed in a manner which will remove the heat from the conductive or metallic flues and distribute the heat to special points in the packing media so that it will reach the baking carbonaceous bodies at a more nearly uniform temperature level.

While the invention has been illustrated and described in one embodiment, it is recognized that variations and changes may be made therein without departing from the invention as set forth in the claims.

I claim:

1. A baking furnace for carbonaceous bodies, comprising a chamber adapted to receive packing media for at least partially surrounding a carbonaceous body, heating means for the body including spaced flues extending in position in the chamber to be surrounded by the packing media, and heat conducting bodies extending in bridging relation between adjacent flues for distributing heat from the flues through the packing media to the carbonaceous body, said heat conducting bodies extending also substantially parallel with said flues.

2. A baking furnace for carbonaceous bodies according to claim 1, wherein the packing media comprises discrete material and the flues are metal and extend through the discrete material.

3. A baking furnace for baking carbonaceous bodies, comprising a chamber for receiving the bodies, heating means including flue ducts in the chamber and exhaust means, packing media for surrounding the bodies, and heat-conducting inserts in the packing media between adjacent flue ducts in position for directing the flow of heat from the flue ducts to points within the packing media and thereby to direct the flow of heat through said inserts and media to the carbonaceous bodies, whereby the temperature gradients within the furnace and bodies are reduced, said inserts extending substantially parallel with said flue ducts.

4. A baking furnace according to claim 3, wherein the inserts have a different rate of heat conduction than the packing media.

5. A baking furnace according to claim 3, wherein the inserts comprise thermally conductive materials more conductive to heat than the packing media.

6. A baking furnace according to claim 3, wherein the inserts are attached to the flue ducts and extend laterally therefrom in the form of fins to direct the flow of heat to special points in the media.

7. A baking furnace according to claim 3, wherein the inserts extend along the flue ducts to the region of the chamber outside of the packing media.